United States Patent [19]

Martenas et al.

[11] Patent Number: 4,505,434
[45] Date of Patent: Mar. 19, 1985

[54] FORAGE HARVESTER RECUTTER SCREEN

[75] Inventors: Wayne B. Martenas, New Holland; Edward H. Priepke, Lancaster, both of Pa.

[73] Assignee: Sperry Corporation, New Holland, Pa.

[21] Appl. No.: 528,014

[22] Filed: Aug. 31, 1983

[51] Int. Cl.³ .............................................. B02C 18/22
[52] U.S. Cl. ..................... 241/89.3; 241/95; 241/101.7; 241/222
[58] Field of Search ................ 241/101.7, 88.1, 88.4, 241/89.3, 89.1, 89.2, 89.4, 95, 222, 223, 224, 73

[56] References Cited

U.S. PATENT DOCUMENTS 2,617,600 11/1952 Cole ...................... 241/89.3
3,377,785  4/1968 Kessler .
3,525,375  8/1970 Heising et al. ............. 241/89.1 X
3,897,016  7/1975 Shah ...................... 241/73
4,186,889  2/1980 Black et al. ............... 241/89.3

Primary Examiner—Mark Rosenbaum
Attorney, Agent, or Firm—Frank A. Seemar; Larry W. Miller; Darrell F. Marquette

[57] ABSTRACT

A forage harvester having an axially transverse generally cylindrical cutterhead mounted for rotation in a housing. The cutterhead includes knives that cooperate with a shearbar mounted at the front of the cutterhead housing to cut crop material being fed rearwardly into the housing over the shearbar under conditions where the cutterhead is being rotated. A removable arcuate screen is mountable rearwardly of the cutterhead and closely adjacent to the peripheral path of the knives. Crop material is forced by the cutterhead through the screen apertures to further cut the crop. Progressively larger apertures are provided in the screen. Desired length of cut determines the initial aperture size whereupon the cut crop material readily passes through the subsequent progressively larger apertures. Crop handling means then collect the crop material and deliver it to discharge apparatus, such as a blower.

5 Claims, 3 Drawing Figures

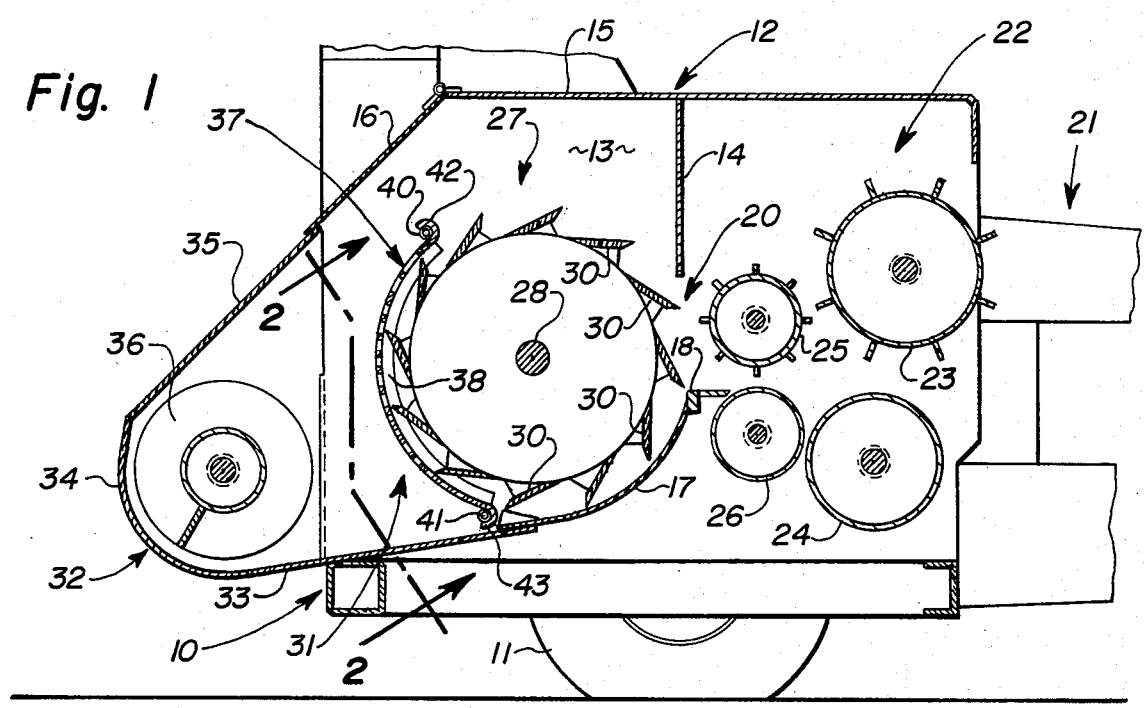

FORAGE HARVESTER RECUTTER SCREEN

BACKGROUND OF THE INVENTION

This invention relates to forage harvesters and, more particularly, to a removable recutter screen mounted in the cutterhead housing adjacent to and rearwardly of the generally cylindrical cutterhead to further reduce crop particle size before it is discharged by urging the crop material into engagement with shearing edges of apertures in the screen.

Recutter screens for forage harvesters with cylindrical type cutterheads have been used for a considerable period of time. The use of such screens provides a finer cut of certain crop material then attained by the principal cutting mechanism, thus making the crop more palatable to a livestock and in most instances easier to feed and store.

Generally, in the past, recutter screens have been provided with a relatively large number of closely spaced round apertures with which the cutterhead interacts to recut and force the crop material therethrough. It is also known to use recutter screens with diagonal slot-shaped apertures, as well as square shaped holes. The length of cut effected by the screen varies according to the actual size of the apertures. Usually available are a series of screens each being provided with different size and shape apertures, so that the operator may utilize the screen that best suits crop conditions and size of cut desired.

Recutter screens in the prior art have been provided with apertures all of which are of the same effective size. This permits a uniform length of cut in the resulting crop product being forced through the screen. Any cut crop material that does not exit through the screen in the first pass past the discharge area, is recirculated by the cutterhead. This recirculation of crop material, commonly referred to as "carryover", gives rise to increased power consumption. Carryover also results in an excessive amount of fine particles of crop material due to the second pass through the principal cutting area, as well as the recutting area.

SUMMARY OF THE INVENTION

According to the present invention, an improved recutter screen is provided for use with cylindrical type cutterheads, the improved recutter screen providing a solution to the carryover problem set forth above. More specifically, a recutter screen is provided with progressively increasing aperture sizes that are varied in configuration depending on the crop material and conditions, whereby material that has not been reduced sufficiently in size to pass through the smaller holes with which it first comes in contact, will contact subsequent shearing edges on the screen as it passes along to larger holes and so on until substantially all the particles exit the cutterhead screen regardless of size.

A feature of this invention resides in the provision of means for reducing cut particles in a forage harvester recutting mechanism to a particular desired size without causing significant increases in power consumption and without giving rise to excessive "fines".

The foregoing and other objects, features and advantages of the invention will appear more fully hereinafter from a consideration of the detailed description which follows, in conjunction with the accompanying sheets of drawings wherein two principal embodiments of the invention are illustrated by way of example. It is to be expressly understood, however, that the drawings are for illustrative purposes and are not to be construed as defining the limits of the invention.

BRIEF DESCRIPTION OF THE DRAWINGS

FIG. 1 is a fore-and-aft vertical section of the rearward portion of a forage harvester showing a recutter screen mounted in the cutterhead housing, the section being viewed from the right through the approximate fore-and-aft center line of the cutterhead.

FIG. 2 is an enlarged sectional view taken along the line 2—2 of FIG. 1 and showing one configuration of Applicants' invention.

FIG. 3 shows a second configuration of the invention, also taken along line 2—2 of FIG. 1.

DESCRIPTION OF THE PREFERRED EMBODIMENT

The invention is embodied in a forage harvester having a mobile main frame, designated generally by reference numeral 10, only the rearward portion of which is depicted by the sectional view in FIG. 1. The forage harvester, of the same general construction as shown in Assignee's U.S. Pat. No. 3,730,441, issued May 1, 1973, includes a pair of ground engaging support wheels 11, only the left one of which is shown in the sectional view of FIG. 1, the machine being viewed from the right side.

The forage harvester further includes a cutterhead housing, designated by reference numeral 12, at the right side of the machine. The cutterhead housing 12 is formed by a pair of opposing upright sidewalls 13, only the left sidewall 13 being shown in FIG. 1 since it is a sectional view, the right sidewall being similar to sidewall 13. The front of the cutterhead housing is formed by a front shield member 14, which extends between the opposing sides 13 and extends downwardly from a top wall portion 15 of the housing, which also spans the width of the housing. Rearwardly of the top wall 15 is a cutterhead access door 16 which is swingable upwardly about a transverse pivot adjacent the rear edge of top wall portion 15.

The lower forward portion of the cutterhead housing is formed by an arcuate bottom wall 17 facing upwardly and rearwardly and also spaning the width of the housing. The uppermost edge of bottom wall 17 terminates at shear bar 18, spaced below the lower edge of front shield member 14 to define an inlet opening 20 in the front of the cutterhead housing 12. The shear bar 18 is of a conventional nature and also spans the full width of the housing.

In conventional forage harvesting apparatus as generally illustrated in the above mentioned U.S. Pat. No. 3,730,441, crop material is fed rearwardly to a cutting mechanism including an inlet and a shearbar 18 of the nature generally depicted in FIG. 1. Headers, an outline of which is generally designated by reference numeral 21 for illustrative purposes, engage standing or windrowed crop in the field and convey it to a conventional feed mechanism 22. Headers are attached forward of the feeder mechanism and most commonly comprise standard windrow pickups or snapper headers when recutter screens are utilized.

More specifically, feed mechanism 22 comprises front and rear pairs of feed rolls 23,24 and 25,26; respectively. The crop is fed over shearbar 18, whereupon it is chopped by a rotating cylindrical shaped cutterhead 27, mounted within cutterhead housing 12 for rotation about transverse axis 28. The cutterhead, schematically illustrated, includes twelve generally longitudinally extending knives 30, mounted at the cutterhead periphery and generating a cylinder as the cutterhead rotates. Shearbar 18 is disposed closely adjacent the cutterhead periphery for cooperation with knives 30 to cut crop material fed by feed mechanism 22 into the cutterhead through inlet opening 20. The cutterhead rotates in a clockwise direction, and material chopped at the shearbar is impelled downwardly and rearwardly to a cutterhead outlet area generally designated by reference numeral 31, spanning the width of the housing and defined by the space between the rearward edge of arcuate member 17 and a point behind axis 28 of cutterhead 27.

Crop urged rearwardly through area 31 is collected in a transversely extending augar trough 32 comprising an upwardly and forwardly inclined front wall 33 that merges with arcuate wall member 17. Trough 32 includes a rear wall 34 and a top wall 35 which in most instances is hinged for ready access thereto.

A transverse auger 36, mounted in auger trough 32, extends the width of the machine, for collecting the crop being urged rearwardly through outlet area 31. Auger 36 moves crop material laterally to conveying apparatus such as a blower in manner illustrated in the above mentioned Patent, No. 3,730,441.

Removably mounted in outlet area 31 between cutterhead 27 and auger 36 is a recutter screen 37. The screen 37 generally arcuate and having substantially the same radius of curvature as the cutterhead periphery, spans the width of the discharge area 31 and is closely adjacent and generally coaxial with the cutterhead periphery. Integral arcuate flange members 38, only one of which is shown in FIG. 1, are provided for securing the screen to sidewalls 13 of the cutterhead housing 12. Additionally, extending between sidewalls 13 are two transverse rod members 40,41 about which the ends of said recutter screen 37 are secured by means of recurved sections 42 and 43. One of said rod members can readily be adapted as a hinge for the screen 37, whereas the other rod may be slidably mounted to secure the recutter screen when installing or removing from the forage harvester. FIG. 2, shows in more detail recurved sections 42 and 43 readily adaptable to accommodate rod members 40 and 41 (FIG. 1).

Now referring to FIG. 2 one embodiment of recutter screen 37 is shown having a plurality of round apertures grouped in first and second series followed by a series of slots. More specifically, the lowermost portion of screen 37 is provided with a first series of round holes 44 followed by a subsequent series of round holes 45 having a substantially greater diameter. The top of the screen is provided with two horizontal rows of elongated slot-like apertures 46. Now turning to FIG. 3, a second embodiment of the recutter screen 37' is shown only elongated slot-like apertures are provided. The width of said slots progressively increases in groups from the bottom to the top of the screen 37', i.e., the first two horizontal rows of apertures comprises slots 44' followed by a second group of slot-like apertures having identical widths of a dimension larger than the aperture width of the first group. These slots are in turn followed by two horizontal rows of slots having a width greater than the width of any of the preceding apertures.

In operation, if a relatively course cut of crop material is desired, no recutter screen is necessary. If, however, a finer cut of material is desired, a screen can be mounted as shown in FIG. 1. The length of cut of material forced through the recutter screen is determined by the width of the apertures first to be engaged by crop material as it is being urged in a clockwise direction from inlet opening 20 to outlet area 31 of cutterhead 27. For example round apertures are recommended for ear corn silage and, therefore, the embodiment shown in FIG. 2 would be installed to provide the desired results when the attachment to the forage harvester is providing ear corn by means of a commonly known snapper head. On the other hand, if haylage or corn silage is being harvested by means of other types of well known attachments, then the embodiment shown in FIG. 3 would be employed because slotted screens are generally recommended for this type of crop material.

Regardless of the crop material being processed, the FIG. 2 and FIG. 3 embodiments both provide the important feature of the invention which improves power consumption and reduces excessive "fines". In FIG. 2, for example, it should be noted that the apertures increase in diameter from the first group 44 to the second group 45. The second group of round apertures is then subsequently followed by a series of elongated apertures or slots 46 having a still larger dimension. This increasing aperture size in the direction of material flow around the cutterhead is varied depending on the crop being processed. As mentioned above, FIG. 2 provides for a series of round apertures for ear corn whereas the embodiment in FIG. 3 provides a series of larger slot-like apertures for haylage. Regardless of the configuration of the apertures, the increasingly larger apertures allow crop particles which have not been reduced sufficiently in size to pass through the preceding smaller holes to contact subsequent shearing edges on the screen. Subsequently, substantially all particles pass through larger holes and therefor are not carried around to the cutting area 18 which in prior art configurations results in excessive power consumption by necessitating recutting and recirculating. This overloads the cutterhead and eventually also further reduces the size of some particles to a size smaller than desirable, both of which undesirable conditions have been overcome by Applicants' invention.

While the preferred structure in which the principles of the present invention have been incorporated is shown and described above, it is to be understood that the invention is not to be limited to the particular details, as shown and desribed above, but that, in fact, widely different means may be employed in the practice of the broader aspects of the invention.

Having thus described the invention, what is claimed is:

1. In a forage harvester having a mobile main frame,
a cutterhead housing mounted on the frame and having a crop inlet area;
means for feeding crop material to said inlet area of said cutterhead housing,
a generally cylindrical cutterhead mounted for rotation in said housing, said cutterhead having a plurality of knives with parallel cutting edges which generate a cylinder along their path at the cutterhead periphery under conditions where the cutterhead rotates said knives into engagement with crop being fed through the inlet area by said crop feeding means,
said knives cutting and said cutterhead impelling crop material along the peripheral path of the knives, crop collection means for collecting and conveying away crop material that has been cut and impelled by said cutterhead, and a generally arcuate shaped recutter screen having a plurality of apertures for cooperating with said knives to recut said cut crop material, said screen mounted closely adjacent the peripheral path of the knives, generally coaxial therewith and between the rear portion of the path of said knives and said collection means, the improvement comprising:

said arcuate recutter screen aperatures being provided in a first series having a first size and a second series having a second size, said second size being greater than said first size and further along said peripheral path of the knives whereby the crop material which is not reduced sufficiently in size by cooperation between said first series of said apertures and said knives to pass through said first of said apertures is recut by cooperation between the knives and subsequent larger apertures in said second series and permitted to pass through such subsequent larger apertures.

2. In a forage harvester as set forth in claim 1 wherein said first and second series of apertures comprise round holes.

3. In a forage harvester as set forth in claim 2 wherein a series of slot-like apertures are included in said arcuate recutter screen subsequent to said second series of apertures.

4. In a forage harvester as set forth in claim 1 wherein said first and second series of apertures are slot-like in shape with elongated generally parallel opposite sides.

5. In a forage harvester as set forth in claim 4 wherein said slot-like apertures extend diagonally relative to the cylindrical path of said knives.

* * * * *